United States Patent [19]
Miyake et al.

[11] Patent Number: 5,572,453
[45] Date of Patent: Nov. 5, 1996

[54] PIPELINE SIGNAL PROCESSOR

[75] Inventors: Jiro Miyake; Kazuki Ninomiya; Tamotsu Nishiyama, all of Osaka, Japan

[73] Assignee: Matsushita Electric Industrial Co., Ltd., Osaka, Japan

[21] Appl. No.: 387,241

[22] Filed: Feb. 13, 1995

[30] Foreign Application Priority Data

Feb. 14, 1994 [JP] Japan ................................ 6-017363

[51] Int. Cl.⁶ ............................................. G06F 7/48
[52] U.S. Cl. .................................................... 364/736
[58] Field of Search ................................. 364/736, 748

[56] References Cited

U.S. PATENT DOCUMENTS

| | | | |
|---|---|---|---|
| 3,875,391 | 4/1975 | Shapiro et al. | 364/736 |
| 4,025,771 | 5/1977 | Lynch, Jr. et al. | 364/736 |
| 4,658,355 | 4/1987 | Hatakeyama et al. | 364/736 |
| 4,773,035 | 9/1988 | Lee et al. | 364/748 |
| 4,916,652 | 4/1990 | Schwarz et al. | 364/748 |

OTHER PUBLICATIONS

C. Joanblanq, et al., "A 54–MHz CMOS Programmable Video Signal Processor for HDTV Applications", IEEE Journal of Solid–State Circuits, vol. 25, No. 3, pp. 730–734, Jun. 1990.

*Primary Examiner*—David H. Malzahn
*Attorney, Agent, or Firm*—McDermott Will & Emery

[57] ABSTRACT

This invention discloses an improved signal processor comprising first to third arithmetic units forming a pipeline structure, first to third control information hold circuits each of which holds control information for its corresponding arithmetic unit, first to third selection circuits, and first to third signal transfer circuits. Transfer of a selection signal is delayed by a proportional interval of time to the processing time of each arithmetic unit. In order to perform the switching of arithmetical operations in each arithmetic unit according to the data flow in the pipeline processing, each selection circuit selects among the control information hold circuits depending on the selection signal transferred and provides control information held in a selected control information hold circuit to a corresponding arithmetic unit.

19 Claims, 13 Drawing Sheets

FIG.4

| CYCLE | t1 | t2 | t3 | t4 | t5 | t6 | t7 | t8 | t9 | t10 | t11 | t12 | t13 |
|---|---|---|---|---|---|---|---|---|---|---|---|---|---|
| DATA(n) | A(1) | A(2) | A(3) | B(1) | B(2) | C(1) | C(2) | C(3) | | | | | |
| DATA(n+1) | | A(1) | A(2) | A(3) | B(1) | B(2) | C(1) | C(2) | C(3) | | | | |
| DATA(n+2) | | | A(1) | A(2) | A(3) | B(1) | B(2) | C(1) | C(2) | C(3) | | | |
| SEL SIG 16 | | | | 1 ✕ 2 | | | | | | | | | |
| SEL SIG 21 | | | | | | 1 ✕ 2 | | | | | | | |
| SEL SIG 22 | | | | | | | | 1 ✕ 2 | | | | | |
| DATA(n+3) | | | | | X(1) | X(2) | X(3) | Y(1) | Y(2) | Z(1) | Z(2) | Z(3) | |
| DATA(n+4) | | | | | | X(1) | X(2) | X(3) | Y(1) | Y(2) | Z(1) | Z(2) | Z(3) |
| DATA(n+5) | | | | | | | X(1) | X(2) | X(3) | Y(1) | Y(2) | Z(1) | Z(2) Z(3) |

PIPELINE SIGNAL PROCESSOR

BACKGROUND OF THE INVENTION

This invention relates to a signal processor using a pipeline architecture to process signals, e.g., video signals.

Conventionally, pipeline architecture has been used to enhance the throughput of digital signal processors. In the pipeline processing, one process is broken into a number of stages so as to perform one stage at the same time that another stage is being performed.

C. Joanblanq et al reported a programmable digital video signal processor for HDTV (high-definition television) in their work entitled "A 54-MHz CMOS Programmable Video Signal Processor for HDTV Applications", IEEE Journal of Solid-State Circuits, Vol. 25, No. 3, pp. 730–734, Jun. 1990. This report shows a technique in which a single chip accommodates multistage-pipelined multiply-add arithmetic circuits to perform filter operations. In accordance with this technique, the transfer function of the filter is determined by a coefficient programmed to each of these multiply-add arithmetic circuits. The transfer function can be changed by simultaneously updating all the programmed coefficients during a line blanking interval while the filter is stopped.

An example as a result of generalizing the structure of the above-described type of conventional signal processor is illustrated in FIG. 12. As shown in the figure, three different arithmetic units (AUs), each of which forms a respective stage, are connected in series. In other words, pipeline processing is performed by these AUs. 201, 202, and 203 are first, second, and third AUs. These AUs 201, 202, and 203 perform pipeline processing in synchronism with a clock signal 204. For example, AUs 201, 202, and 203 are broken into three substages, two substages, and three substages, respectively. 205 is a control circuit which delivers first, second, and third control signals to AUs 201, 202, and 203. The first control signal controls the operation of AU 201. The second control signal controls the operation of AU 202. The third control signal controls the operation of AU 203. 210 is an input unit which provides input data 209 to AU 201 for every clock cycle. In response, AU 201 performs a first arithmetical operation on the input data 209, thereafter providing a result of the first arithmetical operation to AU 202. In response, AU 202 performs a second arithmetical operation on the output of AU 201, thereafter providing a result of the second arithmetical operation to AU 203. In response, AU 203 performs a third arithmetical operation on the output of AU 202, thereafter providing a result of the third arithmetical operation. AU 201 executes either PROCESS A or X according to the first control signal 206. AU 202 executes either PROCESS B or Y according to the second control signal 207. AU 203 executes either PROCESS C or Z according to the third control signal 208.

FIG. 13 is a diagram of pipeline processing by this signal processor. With PROCESS A broken into OPERATIONS A(1), A(2), A(8), AU 201 performs pipeline processing. With PROCESS B broken into OPERATIONS B(1), B(2), AU 202 performs pipeline processing. With PROCESS C broken into OPERATIONS C(1), C(2), C(3), AU 208 performs pipeline processing. Each OPERATION is completed in a single clock cycle.

At cycle t1, DATA (n) is fed to AU 201. Then, DATA (n) is subjected sequentially to PROCESSES A–C. At cycle t8, the processing of DATA (n) is completed, and cycle t9 provides a result of the processing of DATA (n). At cycle t2, DATA (n+1) is fed to AU 201. Then, DATA (n+1) is subjected sequentially to PROCESSES A–C. At cycle t9, the processing of DATA (n+1) is completed, and cycle t10 provides a result of the processing of DATA (n+2). At cycle t3, DATA(n+2) is fed to AU 201. Then, DATA (n+2) is subjected sequentially to PROCESSES A–C. At cycle E10, the processing of DATA (n+2) is completed, and cycle t11 provides a result of tile processing of DATA (n+1). This pipeline processing enables each cycle t9–t11 to yield a result of the processing.

When performing process switching to PROCESSES X–Z from cycle t4 at which DATA (n+3) is fed to AU 201, control circuit 205 tries to simultaneously update all the control signals 206, 207, 208. However, at cycle t4, PROCESS A has not been completed yet with respect to DATA (n+1) and DATA (n+2). Additionally, at cycle t4, with regard to DATA (n), DATA (n+1), and DATA (n+2), neither PROCESS B nor PROCESS C has been completed yet. This incompletion is a bar to simultaneously updating all the control signals 206, 207, 208. Control circuit 205 therefore will have to wait for cycle t11 to come, to simultaneously update all the control signals 206, 207, 208. To sum up, PROCESSES X–Z for DATA (n+3), DATA (n+4) and DATA (n+5) to be fed to AU 201 after cycle t4 and subsequent clock cycles will not be performed until cycle t11 (see FIG. 13).

The above-described signal processor proposed by C. Joanblanq et al employs a structure capable of performing simultaneous process switching during the line blanking interval, so that no problems will be produced as long as such process switching is completed within a line blanking interval. However, it is impossible to perform process switching from a certain pixel in a horizontal line. For example, it is impossible to perform process switching of PROCESSES A–C to PROCESSES X–Z, to handle DATA (n+3) from cycle t4. Further, it is simply impossible to frequently make process switching for every pixel.

Generally speaking, the signal processor of FIG. 12 is designed in such a way as to simultaneously change all the operations of AUs 201, 202, 203. This produces several drawbacks. For example, distortion of the pipeline operations occurs at the time when process switching is made, and the throughput of the signal processor becomes poorer.

SUMMARY OF THE INVENTION

Accordingly, it is an object of the present invention to provide an improved pipeline signal processor capable of performing process switching with broader flexibility, to provide efficient signal processing performance.

With a view to achieving the above-described object, the present invention discloses a technique. In this technique, processing is changed in a pipeline fashion for every arithmetic unit or every data. More specifically, a signal for controlling the switching of processing is transferred or generated according to the data flow through plural arithmetic units together making up a "pipeline", in order that each arithmetic unit undergoes process switching according to the data flow.

The present invention provides a first signal processor. This signal processor has plural transfer circuits and plural selection circuits which are described below, in addition to plural arithmetic units and plural control information hold circuits. These transfer circuits are connected together in series for sequential transfer of a selection signal according to the data flow through the plural arithmetic units. Each transfer circuit receives a selection signal from a preceding stage and transfers the received selection signal to a subsequent stage, with a delay time proportional to the processing time of a corresponding arithmetic unit. In order to control the switching of the arithmetic processing in each arithmetic unit according to the data flow through the arithmetic units, each selection circuit receives a selection signal identical with the one inputted to a corresponding one of the transfer circuits, selects among the control information hold circuits according to the aforesaid received selection signal, and fetches control information held in a selected one of the control information hold circuits, and provides the fetched control information to a corresponding one of the arithmetic units. Where an arithmetic unit forming a single stage is broken into plural substages, these substages are compared to the aforesaid arithmetic units and the processing of the arithmetic units is individually changed in a pipeline fashion according to the data flow.

The aspect of the first signal processor is as follows. The selection signal is sequentially transferred by each transfer circuit according to the data flow. Each selection circuit selectively inputs control information according to a selection signal identical with the one received by a corresponding transfer circuit, thereby controlling the process switching in each arithmetic unit according to the input control information. This arrangement permits the switching of the processing in each arithmetic unit to be performed sequentially according to the data flow.

The present invention provides a second signal processor capable of performing process switching for every arithmetic unit or every data item. This signal processor has plural transfer circuits, plural change control circuits, and plural selection circuits, in addition to plural arithmetic units and plural control information hold circuits. More specifically, the transfer circuits are connected together in series so that, according to the flow of data through the arithmetic units, a validity/invalidity indicating signal or bit indicative of the validity/invalidity of data can be transferred in sequence. Each transfer circuit receives a respective validity/invalidity indicating signal from a preceding stage and provides the received signal to a subsequent stage, with a delay time proportional to the processing time of a corresponding arithmetic unit. Each change control circuit inputs a respective validity/invalidity indicating signal identical with the one received by a corresponding transfer circuit, thereby generating a selection signal according to the received validity/invalidity indicating signal and a predesignated sequence. In order to control the switching of the processing in the arithmetic units according to the data flow through the arithmetic units, the selection circuits receive selection signals from respective corresponding change control circuits, thereby selectively inputting control information from the control information hold circuits according to the input selection signals and providing the selectively inputted control information to corresponding arithmetic units.

The aspect of the second signal processor is as follows. According to the data flow through the arithmetic units, the validity/invalidity indicating signal is sequentially transferred by the transfer circuits. Each change control circuit generates a selection signal according to a validity/invalidity indicating signal received by a corresponding transfer circuit and a predesignated sequence. Each selection circuit selectively inputs control information according to a selection signal generated by a corresponding change control circuit and controls the switching of processing in each arithmetic unit according to the input control information. Such arrangement enables the processing in each arithmetic unit to be changed sequentially according only to the flow of valid data through the arithmetic units forming a pipeline.

The present invention provides a third signal processor. In the second signal processor, the transfer of the validity/invalidity indicating signal is performed by the transfer circuits. However, in the third signal processor, the change control circuit has entries holding validity/invalidity indicating information and a validity/invalidity indicating signal for the next stage is generated according to such information.

The aspect of the third signal processor is as follows. In third signal processor, the change control circuit performs the same function as performed by the transfer circuit of the second signal processor. In other words, each change control circuit inputs a validity/invalidity indicating signal from a preceding stage and generates a selection signal and a validity/invalidity indicating signal to a corresponding selection signal and to a subsequent stage, respectively.

In accordance with the present invention, the transfer or generation of the signal (the selection or validity/invalidity indicating signal) for controlling the switching of the processing in the arithmetic units is performed according to the flow of data through the arithmetic units and the processing in the arithmetic units is sequentially switched according to the transferred or generated signal. As a result, the process switching can be made with broader flexibility. Application of the present invention in, for example, video signal processors makes it possible to facilitate process switching at a specified pixel in a horizontal line and process switching per pixel.

Additionally, in accordance with the present invention, distortion of the pipeline operations can be suppressed and efficient signal processing performance can be obtained.

BRIEF DESCRIPTION OF THE DRAWINGS

FIG. 4 is a timing diagram showing the switching of processing in the FIG. 3 signal processor.

DETAILED DESCRIPTION OF THE INVENTION

Signal processors according to preferred embodiments of the present invention will now be described below by making reference to the accompanying drawing figures. Note that in each embodiment the number of arithmetic units and the number of internal substages in each arithmetic unit are specified. These specified numbers, however, are not to be considered restrictive.

EMBODIMENT 1

Figure 1:
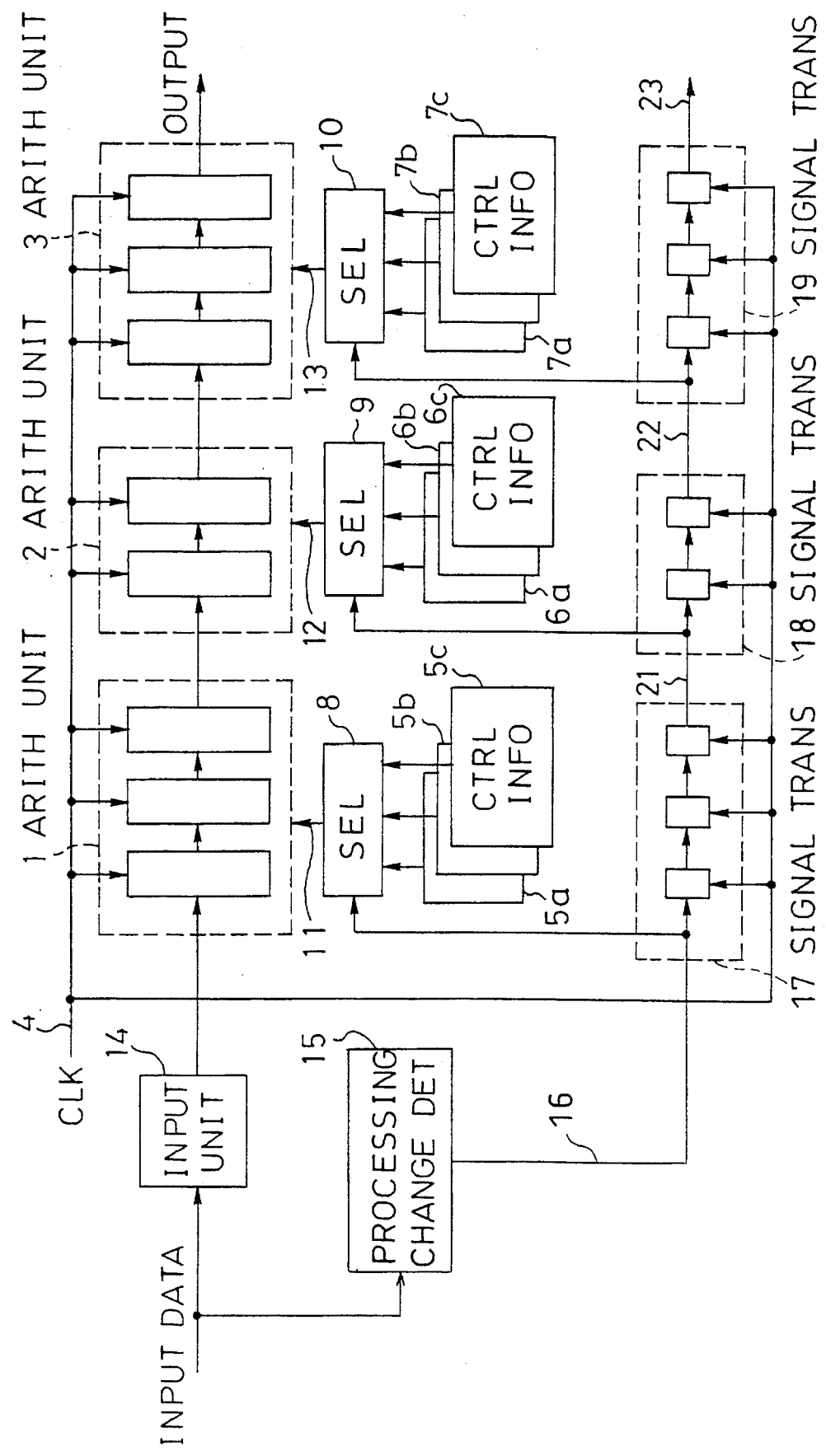
FIG. 1 is a block diagram showing the structure of a signal processor according to a first embodiment of the present invention.
Figure 2:
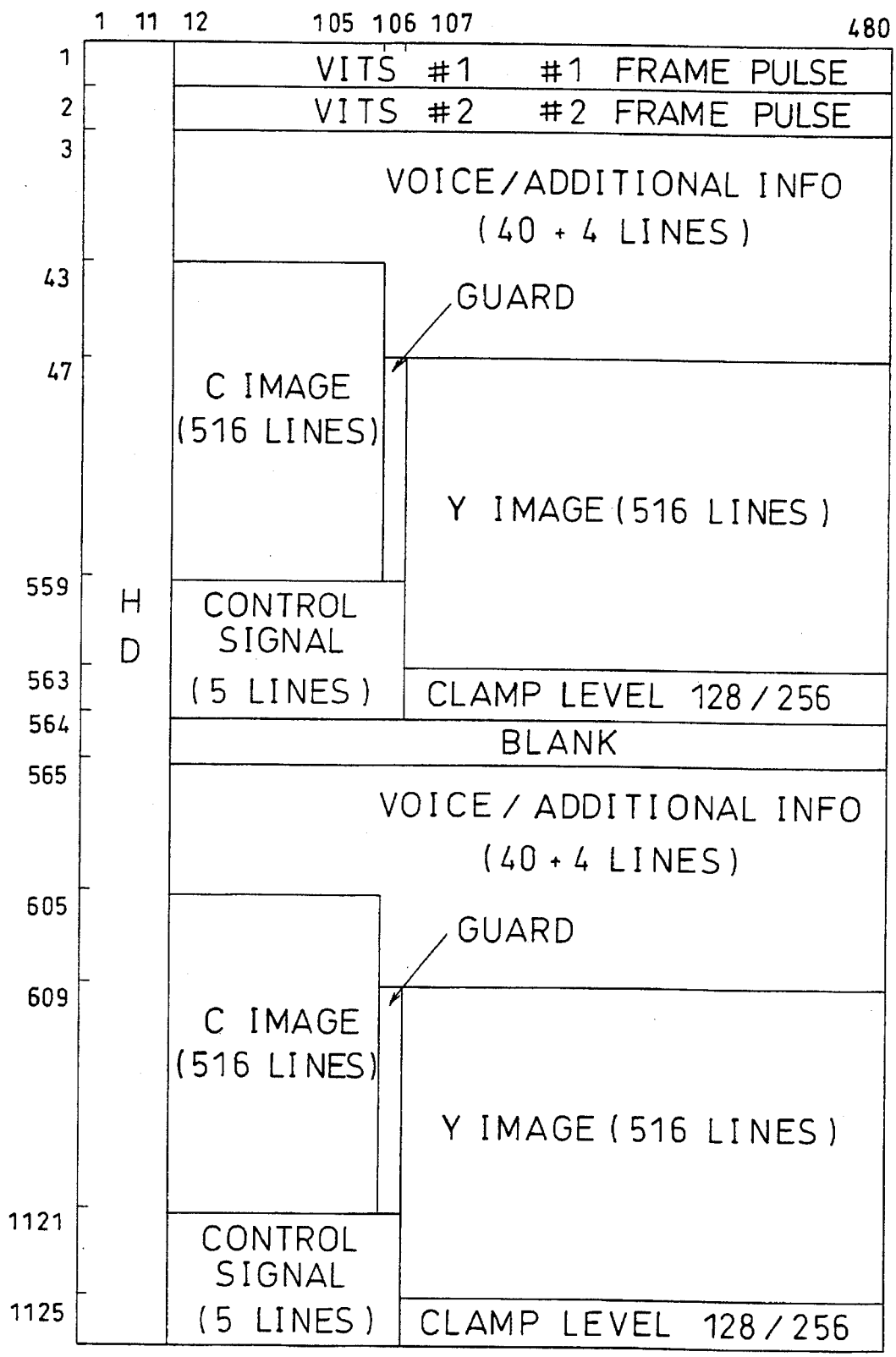
FIG. 2 is a diagram showing an example of the format of an input data signal to be processed in the FIG. 1 signal processor.

FIG. 1 is a block diagram illustrating a signal processor according to a first embodiment of the present invention. 1 is a first arithmetic unit (AU). 2 is a second AU. 3 is a third AU. AUs 1, 2, and 3 perform pipeline processing in synchronism with a clock signal 4. AUs 1, 2, and 3 are broken into three substages, two substages, and three substages, respectively.

5a, 5b, and 5c are control information hold circuits (CIHCs) capable of holding control information used to control the operation of AU 1. First selection circuit 8 performs a selection among CIHCs 5a, 5b, 5c, thereby providing to AU 1 first control information 11 held by a selected one of CIHCs 5a, 5b, 5c. Owing to these three CIHCs 5a, 5b, and 5c, three different types of processing can be designated. Likewise, 6a, 6b, and 6c are CIHCs for AU 2. 9 is a second selection circuit, and 12 is second control information. 7a, 7b, and 7c are CIHCs for AU 3. 10 is a third selector, and 13 is third control information. The first, second, and third control information 11, 12, and 13 may be information used to designate the type of arithmetical operation such as addition and multiplication or information used in arithmetical operations such as multiplication coefficient information.

14 is an input unit. This input unit 14 provides data extracted from an input data signal, to AU 1. For example, in one of the broadcasting systems called a multiple sub-nyquist sampling encoding (MUSE), a 1-frame input data signal is made up of, in addition to a luminance signal Y and a chrominance signal C, an audio signal, a control signal, and various sync signals. The control signal controls the processing of signals. The sync signal includes a frame pulse indicating the start of a frame and an HD signal indicating the start of a line. Input unit 14 detects where a frame, field, or line starts, from a sync signal having a specified pattern contained in an input data signal after a transmitted signal is demodulated or a signal is A/D-converted. By making use of a counter, a signal to be processed such as the luminance signal Y and the chrominance signal C is extracted for output.

AU 1 accepts data from input unit 14 and performs an arithmetical operation on the data according to the first control information 11. The output of AU 1, i.e., a result of the arithmetical operation, is fed to AU 2. In response, AU 2 performs an arithmetical operation on the output of AU 1 according to the control information 12. The output of AU 2 is fed to AU 3. In response, AU 3 performs an arithmetical operation on the output of AU 2 according to the third control information 13. The output of AU 3 is provided.

15 is a change detecting circuit (CDC). This CDC 15 detects process-switching information in an input data signal and sends out a selection signal 16 according to the detected process-switching information. For the case of the MUSE system, the luminance signal Y and the chrominance signal C are split-arranged in a single line and CDC 15 detects the start of a line from a sync signal. Further, a position at which switching between the chrominance signal C and the luminance signal Y takes place is detected by means of, for example, a counter and selection signals 16 corresponding to the chrominance signal C and the luminance signal Y are provided. Since process-switching between the even field and the odd field is required to be performed, CDC 15 provides the selection signal 16 according to the processing of each field on the basis of control and sync signals. 17, 18, and 19 are First, second, third signal transfer circuits (STCs). As seen from FIG. 1, each STC 17, 18, 19 is made up of as many shift registers as the number of pipeline stages of a corresponding AU. In other words. AU 1 is divided into three substages, so that its corresponding signal transfer circuit, i.e., STC 17, is made up of three shift registers. In synchronism with the clock signal 4, the selection signal 16 is transferred according to the data flow through in AUs 1, 2, and 3. In accordance with the present embodiment. STC 17 provides to STC 18 a selection signal 21 three clock cycles after it receives a selection signal 16 from CDC 15. STC 18 provides to STC 19 a selection signal 22 two clock cycles after it receives the selection signal 21 from STC 17. STC 19 provides a selection signal 23 three clock cycles after it receives the selection signal 22 from STC 18. Selection circuit 8, too, accepts the selection signal 18 for performing selection among CIHCs 5a–c. Selection circuit 9, too, accepts the selection signal 21 for performing selection among CIHCs 6a–c. Selection circuit 10, too, accepts the selection signal 22 for performing selection among CIHCs 7a–c.

How the above-described signal processor operates will be described below by making reference to FIG. 1.

Here, a process to be performed according to control information held in CIHC 5a, is referred to as PROCESS A, and a process to be performed according to control information held in CIHC 6a is referred to as PROCESS B, and a process to be performed according to control information held in CIHC 7a is referred to as PROCESS C. Likewise, a process to be performed according to control information held in CIHC 5b is referred to as PROCESS X, and a process to be performed according to control information held by CIHC 6b is referred to as PROCESS Y, and a process to be performed according to control information held CIHC 7b is referred to as PROCESS Z. An example of the operation of the present signal processor will be explained. If CDC 15 causes the selection signal 16 to carry thereon a value of "1", this value "1" is direct-delivered to selection circuit 8 and is also delivered to selection circuits 9 and 10 via STCs 18 and 19, respectively. Accordingly, selection circuits 8, 9, 10 select CIHCs 5a, 6a, and 7a, respectively, thereby causing AUs 1, 2, and 3 to perform PROCESS A, PROCESS B, and PROCESS C, respectively. Such processing can be continued by causing CDC 15 to keep providing the "1" selection signal 16.

Next, a case will be described in which CDC 15 detects process-switching information in an input data signal and process switching is made from PROCESSES A–C to PROCESSES X–Z. Upon detection of process-switching information, CDC 15 changes the value of the selection signal 16 to "2". The selection signal 16 carrying this value "2" is transmitted by STCs 17, 18, and 19 at the same rate that data processing in AUs 1, 2, 3 progresses in a pipeline fashion. In other words, the first data after the detection of the process-switching information by CDC 15 arrives at AU 1 the instant the value "2" arrives at STC 17. Responding to the fact that the value of the selection signal 16 is "2", selection circuit 8 selects CIHC 5b, provides the control information 11 held in CIHC 5b to request AU 1 to perform PROCESS X. The data, fed to AU 1, is subjected to the three-substaged PROCESS X and is outputted to AU 2 three clock cycles later. Concurrently, the selection signal 16 inputted is outputted from STC 17 to STC 18 three clocks later as the selection signal 21. Likewise, according to the data flow in AU 2, the selection signal 21 is outputted from STC 18 as the selection signal 22, and according to the data flow in AU 3, the selection signal 22 is outputted from STC 19 as the selection signal 23. AU 2 switches from PROCESS B to PROCESS Y, and AU 3 switches from PROCESS C to PROCESS Z.

The selection signal 23 from STC 19 may act as a selection signal used to perform the switching of processing in an AU arranged next to AU 3. The selection signal 23 may also act as a signal used to designate which one of plural dedicated AUs arranged next to AU 3 receives the output of AU 3. For example, after the processing of the luminance signal Y and the processing of the chrominance signal C are selectively performed in AUs 1, 2, 3, the selection signal 23 may be used to transmit the results of the luminance signal processing to a subsequent AU dedicated to processing only luminance signals and to transmit the results of the chrominance signal processing to a subsequent AU dedicated to processing only chrominance signals. STC 19 of the last stage may be removed.

EMBODIMENT 2

In the first embodiment, the switching of the control information is performed for each arithmetic unit upon arrival of a selection signal. However, control information may be divided for each substage of an arithmetic unit, and according to the progress of data processing in a pipeline or according to the progress of selection signal transfer in shift registers of a signal transmission circuit, the switching of processing may be performed for each substage.

Figure 3:
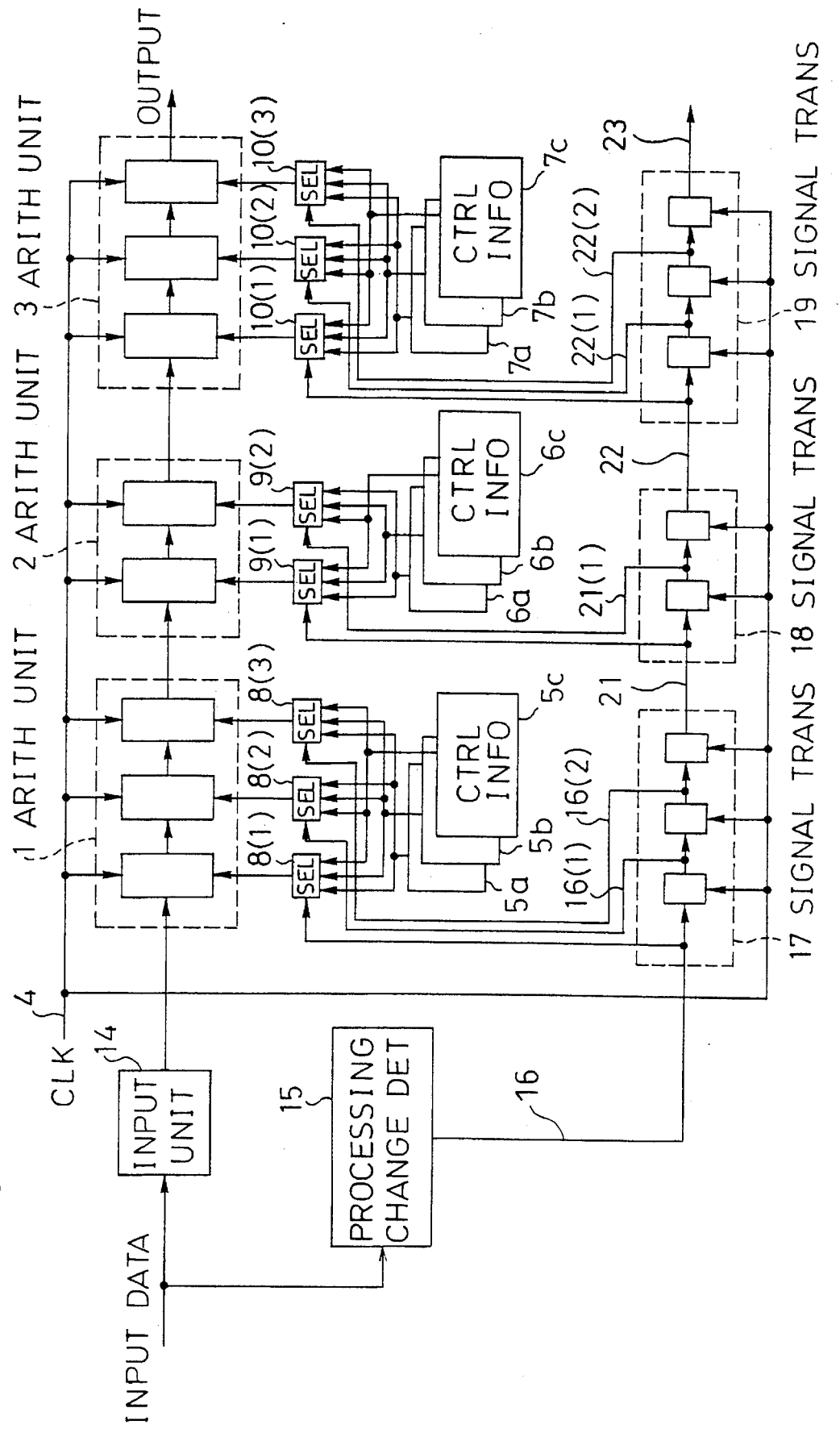
FIG. 3 is a block diagram showing the structure of a signal processor according to a second embodiment of the present invention.

FIG. 3 is a block diagram illustrating a signal processor according to a second embodiment of the present invention. A selection circuit corresponding to AU 1 of FIG. 1 is made up of three sub-selection circuits (SSCs) 8(1), 8(2), and 8(3) each of which forms a respective substage. SSC 8(1) selects one of CIHCs 5a–c according to a selection signal 16. SSC 8(2) selects one of CIHCs 5a–c according to a selection signal 16(1) from STC 17 with a delay of one clock cycle with respect to the selection signal 16. SSC 8(3) selects one of CIHCs 5a–c according to a selection signal 16(2) from STC 17 with a delay of two clock cycles with respect to the selection signal 16. Likewise, a selection circuit corresponding to AU 2 of FIG. 1 is made up of two SSCs 9(1) and 9(2) each of which forms a respective substage. Whereas SSC 9(1) selects one of CIHCs 6a–c according to a selection signal 21 from STC 18, SSC 9(2) selects one of CIHCs 6a–c according to a selection signal 21(1) from STC 18. This selection signal 21(1) is delayed by one clock cycle with respect to the selection signal 21. A selection circuit corresponding to AU 3 of FIG. 1 is made up of three SSCs 10(1), 10(2), and 10(3) each of which forms a respective substage. SSC 10(1) selects one of CIHCs 7a–c according to a selection signal 22. SSC 10(2) selects one of CIHCs 7a–c according to a selection signal 22(1). SSC 10(3) selects one of CIHCs 7a–c according to a selection signal 22(2). These selection signals 22(1) and 22(2) are delayed by one clock cycle and two clock cycles respectively with respect to the selection signal 22.

FIG. 4 is a timing diagram showing a case in which process switching by a selection signal is performed by the substage using the FIG. 3 signal processor. In FIG. 4, DATA (n) represents an nth input data. Input unit 14 feeds input data to AU 1 for each clock cycle. DATA (n) is fed to AU 1 at cycle t1. OPERATIONS A(1)–(3) of PROCESS A are performed by AU 1 on DATA (n) at cycles t1, t2, and t3, respectively. At cycle t4, a result of PROCESS A is provided to AU 2. Next, OPERATIONS B(1)–(2) of PROCESS B are performed by AU 2 on the result of PROCESS A at cycles t4 and t5, respectively. At cycle t6, a result of PROCESS B is fed to AU 3. Then, OPERATIONS C(1)–(3) of PROCESS C are performed by AU 3 on the result of PROCESS B at cycles t6, t7, and t8, respectively. At cycle t9, a result of PROCESS C is provided. The same procedure will be done on DATA (n+1). More specifically, at cycle t2, DATA (n+1) is fed to AU 1. Thereafter, PROCESSES A–C are performed on the DATA (n+1) in a pipeline fashion, and the result becomes available at cycle t10. CDC 15 causes the selection signal 16 to carry thereon a value of "1" in order that PROCESSES A–C are performed.

Referring still to FIG. 4, a case will be explained below in which process switching is made from PROCESSES A–C to PROCESSES X–Z at the processing of DATA (n+3). When CDC 15 detects process-switching information after DATA (n+2) is fed to AU 1, CDC 15 causes the selection signal 16 to carry thereon a value of "2". This value "2" is fed to SSC 8(1) at cycle t4 at the same time that DATA (n+3) is fed to AU 1. In the first stage of AU 1, the value "2" causes OPERATION X(1) to be performed. However, the value of the selection signal 16 remains to be "1" with respect to the subsequent stages of AU 1, so that pre-process switching operations are still being performed. For example, at cycle t4, OPERATION B(1) is being performed on DATA (n), and OPERATION A(3) is being performed on DATA (n+1), and OPERATION A(2) is being performed on DATA (n+2). With the data processing flow, the value conveyed by the selection signal 16 is transmitted by means of STCs 17–19, and depending on the value of the selection signal 16 the processing in each of AUs 1–3 changes by the operation.

As described above, in accordance with the first and second embodiments, the selection signal is transmitted according to the data processing flow and the processing is changed for each pipeline stage. This enables the processing to change without waiting for each arithmetic unit to complete a pre-process-switching operation, thereby enhancing the speed of data processing. Additionally, such an arrangement that the selection signal is transmitted according to the pipeline processing facilitates the control of a signal processor.

EMBODIMENT 3

Figure 5:
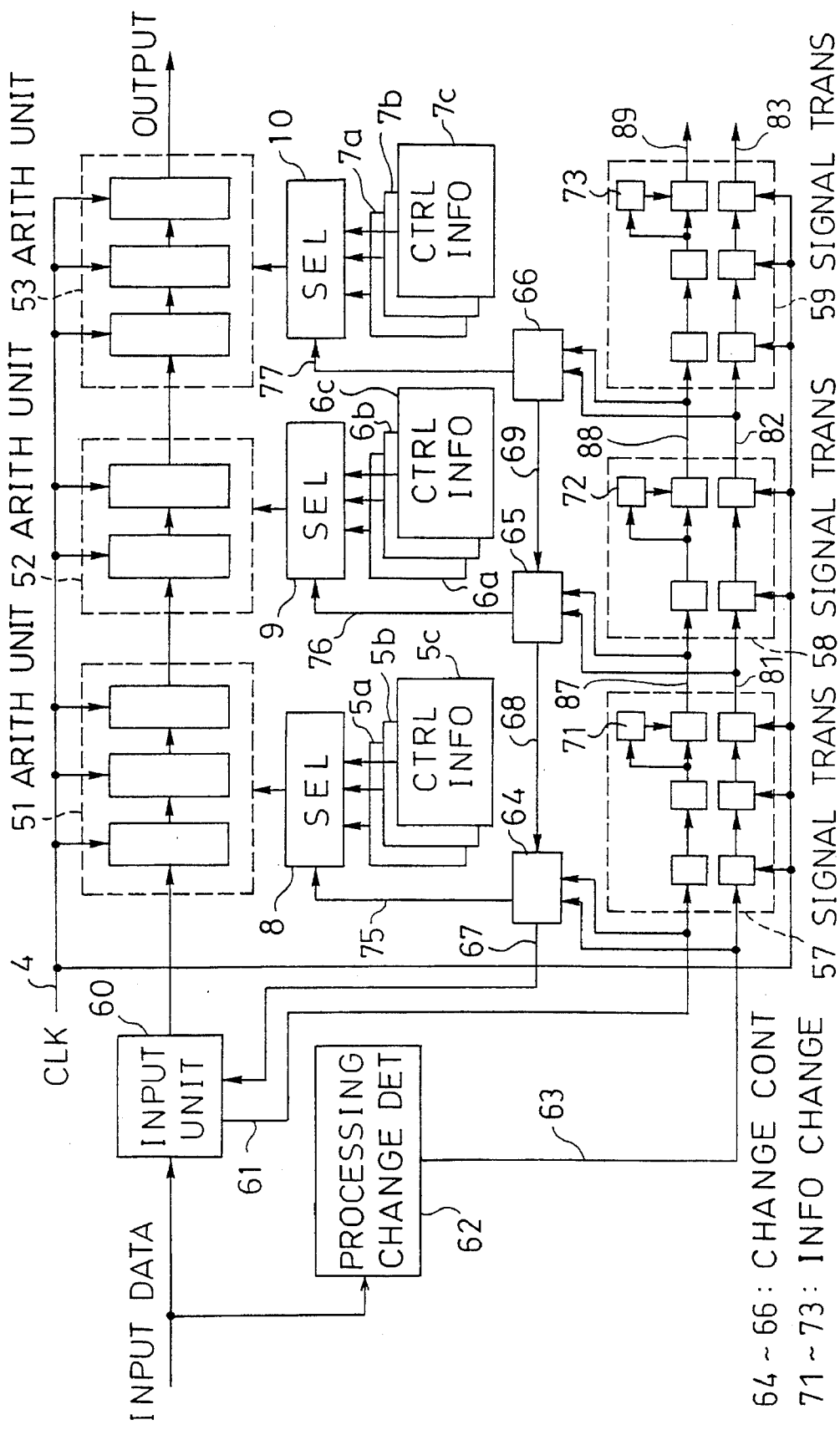
FIG. 5 is a block diagram showing the structure of a signal processor according to a third embodiment of the present invention.

FIG. 5 is a block diagram illustrating a signal processor according to a third embodiment of the present invention. 51, 52, and 53 are first, second, and third arithmetic units (AUs). AU 51 is broken into three substages, AU 52 into two substages, and AU 53 into three substages. AU 51, 52, 53 perform pipeline processing in synchronism with the clock signal 4. 60 is an input unit. This input unit 60 not only provides data extracted from an input data signal to AU 51 but also provides a validity/invalidity indicating signal (valid bit) 61 indicative of whether the extracted data is valid or invalid. If tile sampling frequency of an input data signal and the operating frequency of AU 51 are identical, input unit 60 provides a validity/invalidity indicating signal 61 for every clock cycle. When the operating frequency of AU 51 is n times the sampling frequency of an input data signal, input unit 60 provides the validity/invalidity indicating signal 61 For every n cycles. 62 is a change detecting circuit (CDC). When CDC 62 detects process-switching information in an input data signal, CDC 62 delivers a change signal 68.

57, 58, and 59 are first, second, and third signal transfer circuits (STCs) corresponding to AUs 51, 52, and 53, respectively. STCs 57, 58, 59 are for transfer of the validity/invalidity indicating signal 61 from input unit 60 and the change signal 63 from CDC 62 according to the flow of data to be processed in each AU 51, 52, 53. In the present embodiment, STC 57 provides a validity/invalidity indicating signal 87 to STC 58 three clock cycles after STC 57 receives a validity/invalidity indicating signal 61 from input unit 60. STC 58 provides a validity/invalidity indicating signal 88 to STC 59 two clock cycles after STC 58 receives the validity/invalidity indicating signal 87 from STC 57. STC 89 provides a validity/invalidity indicating signal 89 three clock cycles after STC 89 receives the validity/invalidity indicating signal 88 from STC 58. Concurrently, STC 57 provides a change signal 81 to STC 58 three clock cycles after STC 57 receives a change signal 68 from CDC 62. STC 58 provides a change signal 82 to STC 59 two clock cycles after STC 58 receives the change signal 81 from STC 57c. STC 59 provides a change signal 88 three clock cycles after STC 59 receives the change signal 82 from STC 58.

64, 65, and 66 are first, second, and third change control circuits (CCCs) corresponding to STCs 57, 58, and 59, respectively. CCCs 64–66 input the validity/invalidity indicating signals 61, 87, 88 and the change signals 81, 82 that are also applied to their corresponding STCs i.e., STCs 57–59) and deliver selection signals 75–77 to selection circuits 8–10 in a predesignated sequence (see FIG. 5). Selection circuit 8 selects one of CIHCs 5a, 5b, and 5c according to the selection signal 75, thereafter providing information held in a selected one of CIHCs 5a, 5b, and 5c to AU 51. Selection circuit 9 selects one of CIHCs 6a, 6b, and 6c according to the selection signal thereafter providing information held in a selected one of CIHCs 6a, 6b, and 6c to AU 52. Selection circuit 10 selects one of CIHCs 7a, 7b, and 7c according to the selection signal 77, thereafter providing information held in a selected one of CIHCs 7a, 7b , and 7c to AU 53. For example, CCC 64 may exert control in such a way that CIHCs 5a, 5b, and 5c are selected alternately per clock cycle, allowing AU 51 to sequentially perform three different types of operations.

CCC 64 can provide an input stop signal 67 in order to stop the supply of data from input unit 60 to AU 51. CCC 65 can provide an input stop signal 68 in order to stop the supply of data from AU 51 to AU 52. CCC 66 can provide an input stop signal 69 in order to stop the supply of data from AU 52 to AU 53. This arrangement allows two or three different operations to be performed sequentially on the same data by the clock. Upon receiving the input stop signal 67 from CCC 64, input unit 60 stops outputting data to AU 51. Upon receiving the input stop signal 68 from CCC 65, CCC 64 exerts control so as to stop AU 51. Upon receiving the input stop signal 69 from CCC 66, CCC 65 exerts control so as to stop AU 52. Further, as in the first embodiment, upon receipt of the change signal 63 (81, 82) that is also applied to STC 57 (58, 59), CCC 64 (65, 66) causes selection circuit 8 (9, 10) to select among CIHCs 5a–c (6a–c, 7a–c) or to change the sequence of selection. As described above, by means of CCCs 64, 65, and 66, the switching of processing can be made for every clock cycle or for every change signal.

STCs 57, 58, and 59 may contain information change circuits (ICCs) 71, 72, and 73 to change the validity/invalidity indicating signals 87, 88, and 89. For example, one out of two incoming validity/invalidity indicating signals may be invalidated. This can reduce the number of data items from a corresponding arithmetic unit by half.

Figure 6:
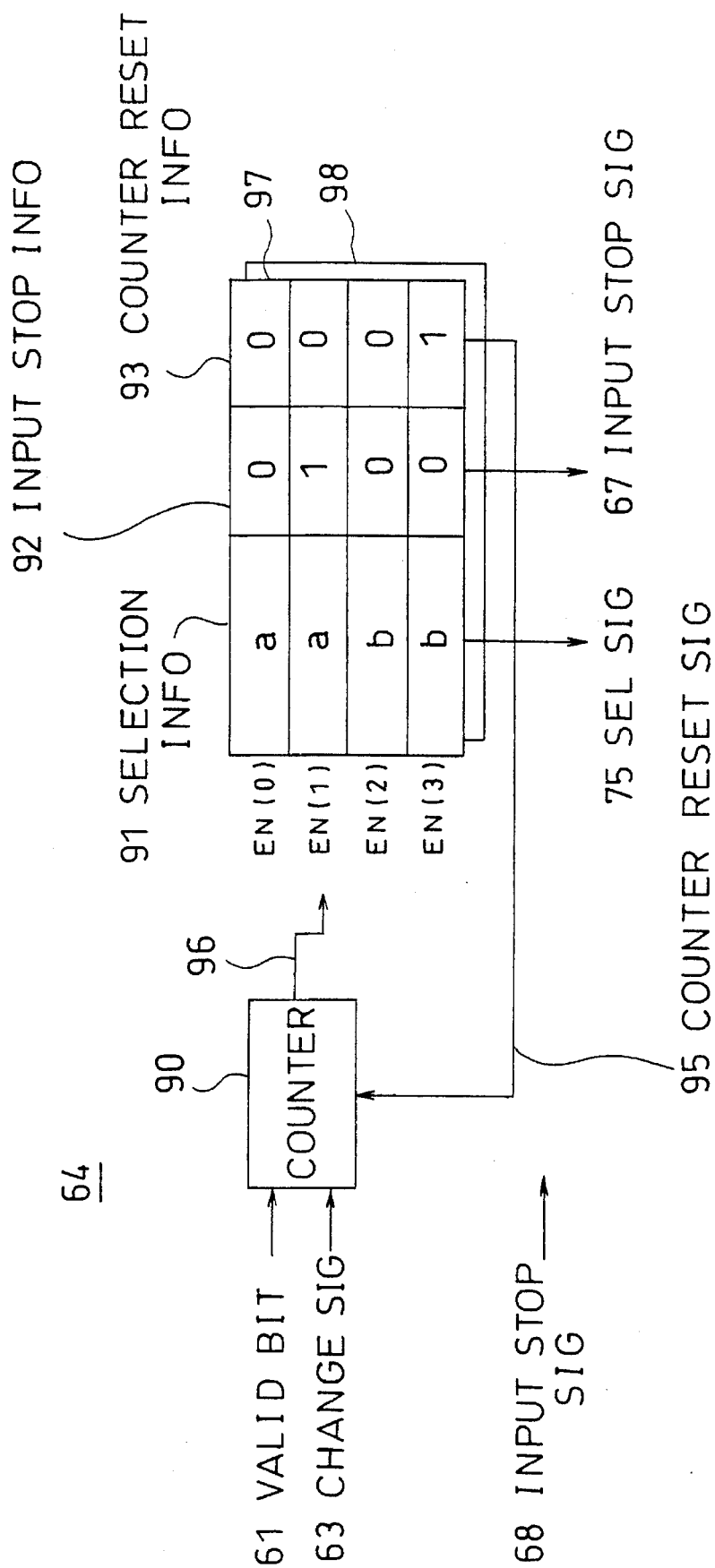
FIG. 6 is a block diagram showing the internal structure of a change control circuit of FIG. 5.

FIG. 6 is a block diagram showing an example of the internal structure of CCC 64. 90 is a counter. This counter 90 counts the total of the number of validity/invalidity indicating signals 61 carrying a value of "1" and provides a result of the counting operation. CCC 64, shown in FIG. 6, has a set of four entries 97 and a set of four entries 98. Each entry contains selection information 91 For selecting one of CIHCs 5a, 5b, and input stop information 92 for controlling the way AU 51 holds input data, and counter reset information 93. The change signal 63, applied to counter 90, causes a change between the sets 97 and 98.

Here it is assumed that the set 97 with four entries, i.e., EN(0), EN(1), EN(2), and EN(8), is chosen. Of these four entries one is selected by the output of counter 90 indicated in the figure by reference numeral 96, whereupon the selection information 91, the input stop information 92, and the counter reset information 93 are read out of the selected entry. The counter reset information 93 thus read is provided to counter 90 as a counter reset signal 95. When the counter reset signal 93 is "1", counter 90 will be reset to zero the next time the validity/invalidity indicating signal 61 becomes "1". The selection information 91 thus read is provided to selection circuit 8 as the selection signal 75 used to select one of CIHCs 5a, 5b, and 5c. The input stop information 92 thus read is provided to input unit 60 as the input stop signal 67 used to hold data to be fed to AU 51. In the example shown in FIG. 6, EN(0), EN(1), EN(2), and EN(3) are sequentially read. "a") is read twice and "b" is also read twice, as the selection information 91. Depending upon the value of "a" and the value of "b", selecting among the CIHCs is performed. The input stop information 92 of EN(1) is "1", and data to be inputted to AU 51 is held, and the same data is used in an operation at the next clock cycle.

Figure 8:
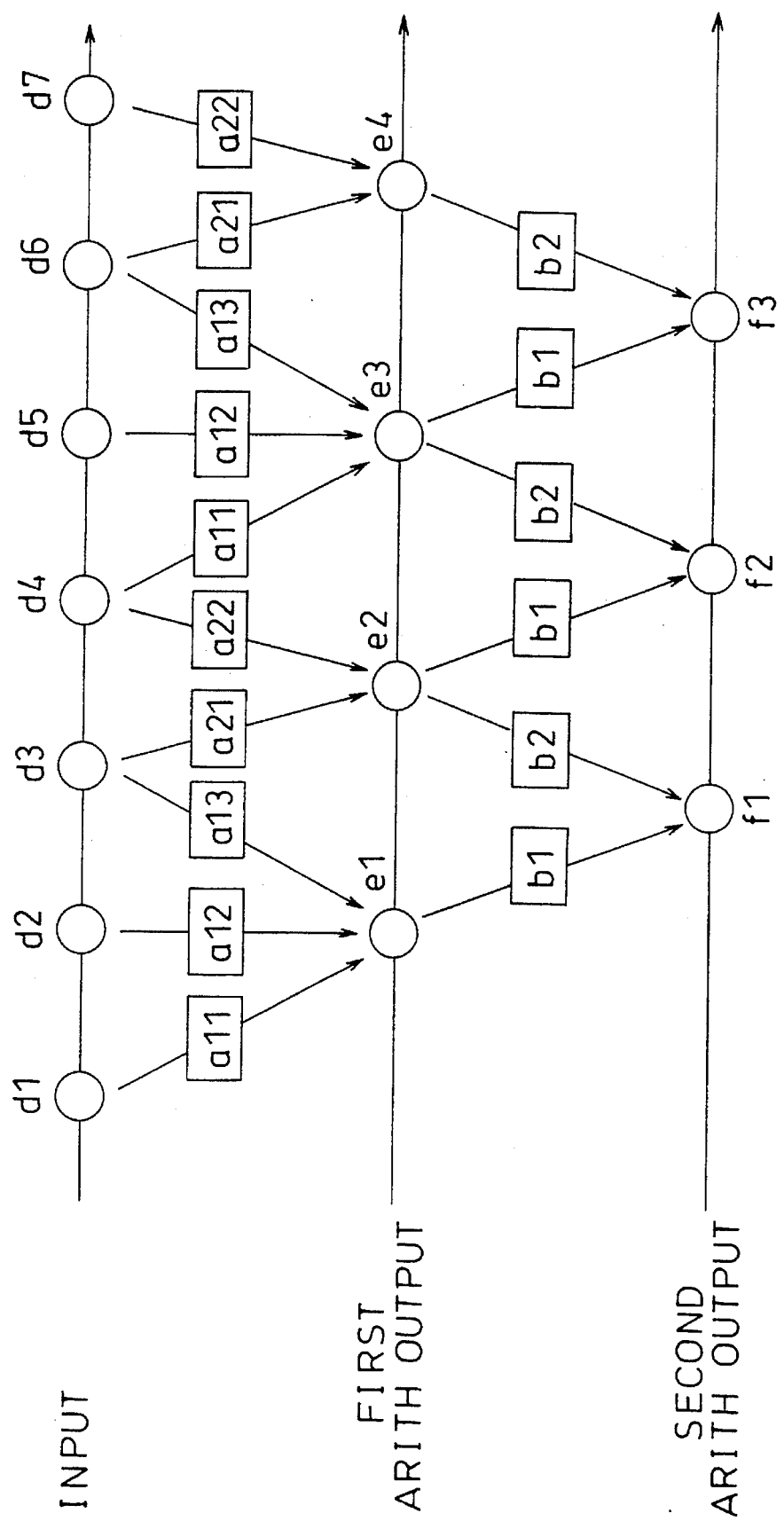
FIG. 8 is a diagram showing an example of the arithmetic processing executed in the FIG. 5 signal processor.

CCCs 65 and 66 have the same internal structure as CCC 64 (see FIG. 8). Owing to CCCs 64–88, it is possible to perform a selection among the CIHCs with respect to valid data according to the contents of previously set entries and it is also possible to issue an instruction for holding data to be fed to an arithmetic unit.

Figure 7:
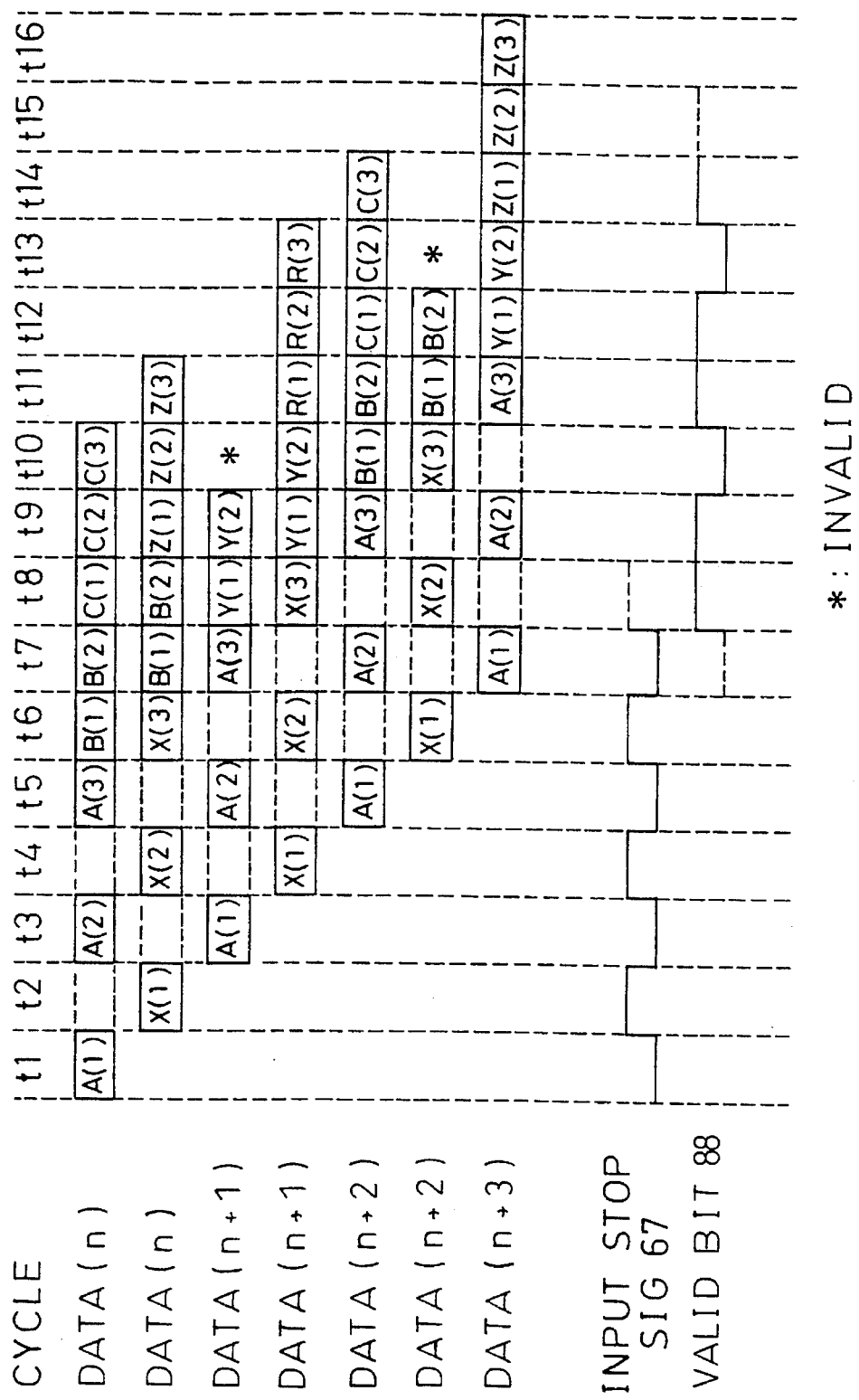
FIG. 7 is a timing diagram showing the switching of processing in the FIG. 5 signal processor.

An example of the operation is described by making reference to FIG. 7. In this example, PROCESS A and PROCESS X are alternately performed on a single piece of data by means of AU 51. In AU 52, PROCESS B and PROCESS Y are alternately performed for every two clock cycles, and two out of three results of the processing are outputted. In AU 53, PROCESS C, PROCESS Z, and PROCESS R are alternately performed on valid data provided.

At cycle t1, OPERATION A(1) of PROCESS A is performed on DATA (n). At cycle t2, CCC 64 delivers to input unit 60 the input stop signal 67 indicative of "1". Upon receipt of the input stop signal 67, input unit 60 holds DATA (n), and CCC 64 provides the selection signal 75 in order that CIHC 5b that holds information about PROCESS X is selected, and the processing in AU 51 is changed from PROCESS A to PROCESS X, to perform OPERATION X(1). At cycle t3, the input stop signal 67 becomes "0", and DATA (n+1) is inputted, and CCC 64 provides the selection signal 75 in order that CIHC 5a, that holds information about PROCESS A is selected, and OPERATION A(1) is carried out. Simultaneously, OPERATION A(2) is performed on DATA (n). To sum up. OPERATIONS A(1), X(1), A(2), X(2), A(3), and X(3) are performed on DATA (n) at cycles t1, t2, t3, t4, t5, and t6, respectively, the result of which is provided to AU In AU 52, process switching between PROCESS B and PROCESS Y is performed for every two data items. In other words, PROCESS B is performed on first two data items, and PROCESS Y is performed on the next two data items. This is carried out repeatedly. One out of three results obtained is invalidated. This is realized by, when providing data to be invalidated, causing a corresponding validity/ invalidity indicating signal, i.e., the validity/invalidity indicating signal 88 from STC 58, to carry a value of "0". In this example, OPERATION Y(2) is performed on DATA (n+1) at cycle t9, and when outputting a result of OPERATION Y(2), the validity/invalidity indicating signal 88 is made to become "0". Likewise, DATA (n+2) which has undergone PROCESSES X and B is invalidated at cycle t13.

In AU 53, process switching among PROCESS C, PROCESS Z, and PROCESS R is performed for each data that is recognized valid by the validity/invalidity indicating signal 88. In this way, the processing in AU 53 progresses in a pipeline fashion while making process switching. At cycle t11, a result, found by performing PROCESSES A, B, C on DATA (n), becomes available. At cycle t12, a result, found by performing PROCESSES X, B, Z on DATA (n), becomes available. At cycle t14, a result, found by performing PROCESSES X, Y, R on DATA (n+1), becomes available. At cycle t15, a result, Found by performing PROCESSES A, B, C on DATA (n+2), becomes available.

The validity/invalidity indicating signal 89 from STC 59 may act as a signal indicative of whether input data to an arithmetic unit arranged next to AU 53 is valid or invalid. Additionally, the validity/invalidity indicating signal 89 may be used to store only valid ones of results of the processing by AU 53, to save memory storage space. STC 59 of the last stage may be removed if not necessary.

Figure 9:
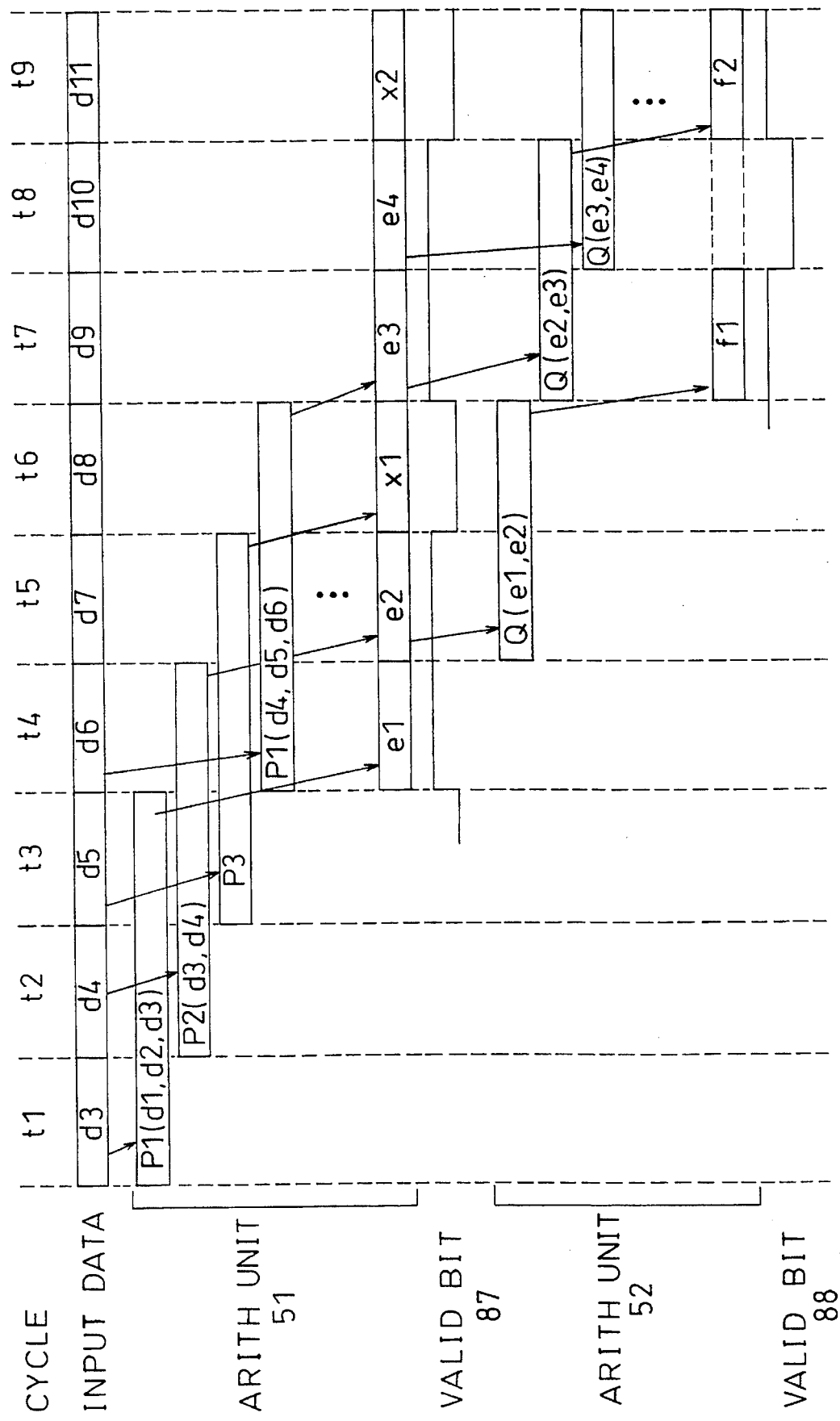
FIG. 9 is a timing diagram showing the operation of the FIG. 5 signal processor when executing the FIG. 8 arithmetic processing.

Referring now to FIGS. 8 and 9, a way of using the validity/invalidity indicating signal in the FIG. 5 signal processor will be described. In tile MUSE system, a reduction in the data count is required when performing interfield interpolation on an interframe-interpolated pixel signal during the still-picture processing of the luminance signal Y. More specifically, one out of four data items in a pixel signal having a frequency of 32 MHz is cancelled, to generate a 24 MHz pixel signal. However, to make the description simple, a process in which one out of three data items is cancelled will be described here. In FIG. 8, d1, d2 . . . are input pixel data, and e1, e2, . . . are post-reduction pixel data. e1 is yielded by multiplying d1, d2, and d3 by respective coefficients a11, a12, and a13 and summing together the results, i,e., the products. e2 is yielded by multiplying d3 and d4 by respective coefficients a21 and a22 and summing together the results. e3 is yielded by multiplying d4, d5, and d6 by respective coefficients a11, a12, and a13 and summing together the results. e4 is yielded by multiplying dB and d7 by respective coefficients a21 and a22 and summing together the results. The number of data items to be processed is reduced by one third, and two consecutive ones of e1, e2, e3, e4 . . . are subjected to a multiply-add operation (see FIG. 8). f1 is obtained by multiplying two consecutive data items, i.e., e1 and e2, by respective coefficients b1 and b2 and summing together the products. f2 is obtained by multiplying two consecutive data items, i.e., e2 and e3, by respective coefficients b1 and b2 and summing together the products. f3 is obtained by multiplying two consecutive data items, i.e., e3 and e4, by respective coefficients b1 and b2 and summing together the products.

With reference to FIG. 9, the operation of the FIG. 5 signal processor for the FIG. 8 arithmetical processing will be described, in which PROCESS P1 is an operation for multiplying three data items, e.g., d1, d2, and d3, by all, a12, and a13 and summing together the products, and PROCESS P2 is an operation for multiplying two data items, e.g., d3 and d4, by a21 and a22 and summing together the products, and PROCESS Q is an operation for multiplying two consecutive data items, e.g., e1 and e2, by b1 and b2 and summing together the products. In this case, STC 57 receives the validity/invalidity indicating signal 61 continuously carrying a value of "1".

Upon receipt of d3 at cycle t1, AU 51 performs PROCESS P1 with respect to d1, d2 that have already been inputted and d3 (i.e., d1×a11+d2×a12÷d3×a13). Upon receipt of d4 at cycle t2, AU 51 performs PROCESS P2 with respect to d3 and d4. Even if d5 is provided at cycle t3, AU 51 is not able to perform PROCESS P1 because d6 has not arrived yet. This situation causes AU 51 to perform PROCESS P3 in vain. When d6, d7, d8 . . . are provided after cycle t4 and the subsequent cycles, PROCESS P1, PROCESS P2, and PROCESS P3 are repeatedly executed in sequence. As a result, AU 51 provides to AU 52 e1(VALID), e2(VALID), x1(INVALID), e3(VALID), e4(VALID), and x2(INVALID) at cycle t4, cycle t5, cycle t6, cycle t7, cycle t8, and cycle t9, respectively. STC 57 changes the value of the validity/ invalidity indicating signal 61 to "0" so as to indicate that x1 and x2 produced by PROCESS P3 are invalid data and provides the validity/invalidity indicating signal 87.

AU 52 is controlled according to the validity/invalidity indicating signal 87 in such a way as to fetch only valid ones of output data items from AU 51 and perform PROCESS Q on them. For a case where the validity/invalidity indicating signal 87 is not used in AU 52, a set of e1 and e2 and a set of e2, x1, and e3 are dealt with by different types of processing. This, however, produces the problem that the control of the processing becomes too complicated to perform. Even x1 which is an invalid data item is inputted, therefore increasing the size of a data hold circuit. Conversely, in accordance with the present embodiment, AU 52 fetches only valid data items and both two different data items fetched are handled by the same processing (i.e., PROCESS Q). This facilitates the processing control and makes it possible to reduce the number of, for example, data hold circuits because invalid data items are not inputted.

In accordance with the third embodiment, the change control circuit changes and provides a selection signal for selecting one of the control information hold circuits, whereupon a complicated combination of operations can be performed easily. Additionally, the distortion of the pipeline processing due to process switching, i.e., the drop in the throughput, becomes preventable. Further, the change control circuit provides an input stop signal, so that it becomes possible to perform switching among a number of processes per clock cycle to process the same data. Furthermore, the validity/invalidity indicating signal is transferred according to the data processing flow and is changed depending upon whether the data is valid or invalid. This allows process switching to be performed with respect to valid data and the switching of processing can be controlled easily. In the present embodiment, both the validity/invalidity indicating signal and the change signal are transferred. However, only the validity/invalidity indicating signal may be transferred with the data flow.

EMBODIMENT 4

In the third embodiment, the validity/invalidity indicating signal is transferred using a signal transfer circuit. However, as shown in FIGS. 10 and 11, application of the validity/invalidity indicating signal my be controlled according to validity/invalidity indicating information stored in an entry of the change control circuit.

Figure 10:
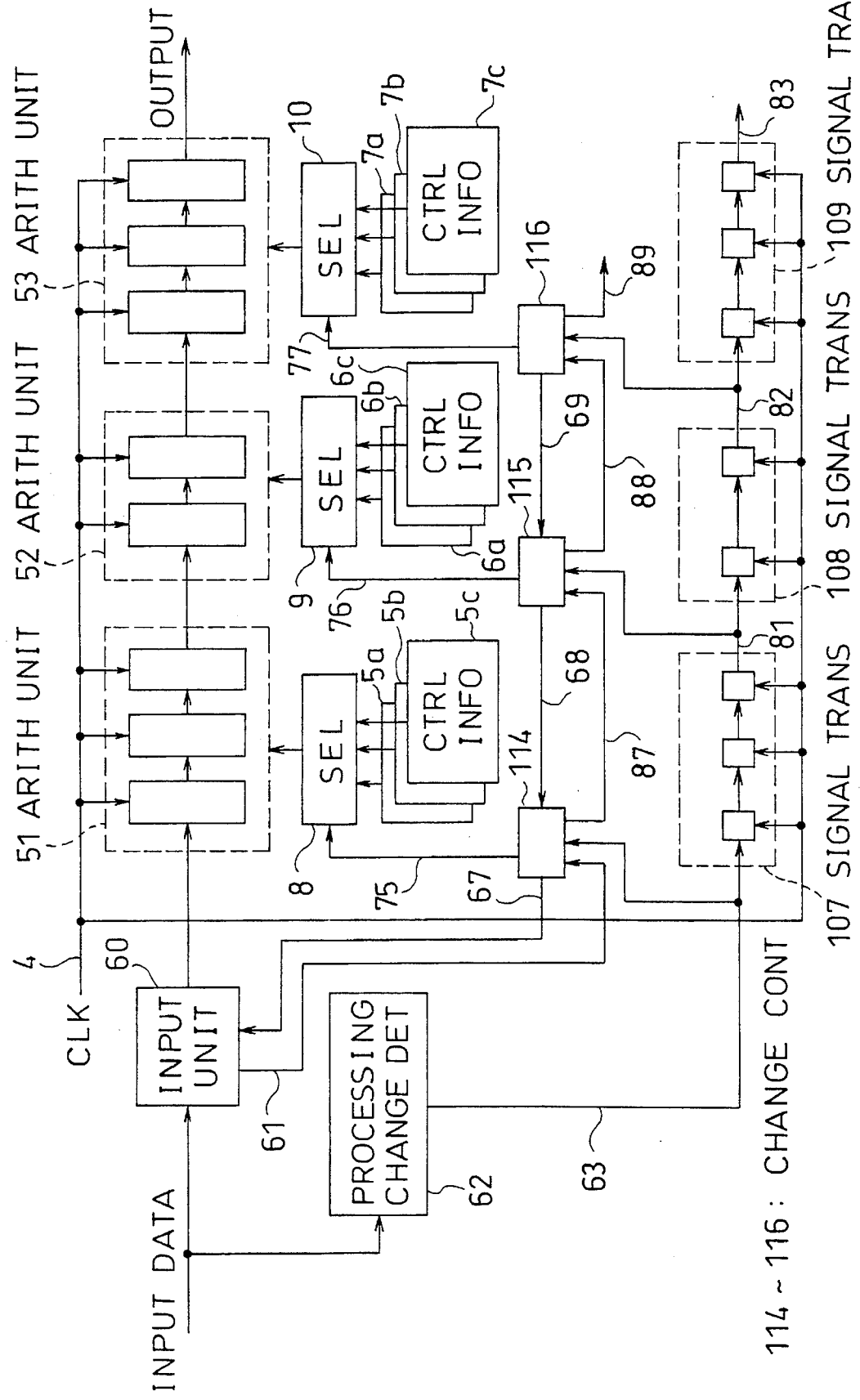
FIG. 10 is a block diagram showing the structure of a signal processor according to a fourth embodiment of the present invention.

FIG. 10 is a block diagram illustrating a signal processor according to a fourth embodiment of the present invention. Only the change signal 63 From CDC 62 is transferred by first, second, and third STCs 107, 108, and 109 according to the flow of data in AUs 51, 52, and 53. First CCC 114 controls generation of the validity/invalidity indicating signal 87 and the selection signal 75 on the basis of the validity/invalidity indicating signal 61 from input unit 60 and the change signal 63 from CDC 62. Second CCC 115 controls generation of the validity/invalidity indicating signal 88 and the selection signal 76 on the basis of the validity/invalidity indicating signal 87 from CCC 114 and the change signal 81 from STC 107. Third CCC 116 controls generation of the validity/invalidity indicating signal 89 and the selection signal 77 on the basis of the validity/invalidity indicating signal 88 from CCC 115 and the change signal 62 from STC 108. CCCs 114, 115, and 116 and their counterparts of the third embodiment function the same way in generating the input stop signals 67, 68, and 69.

Figure 11:
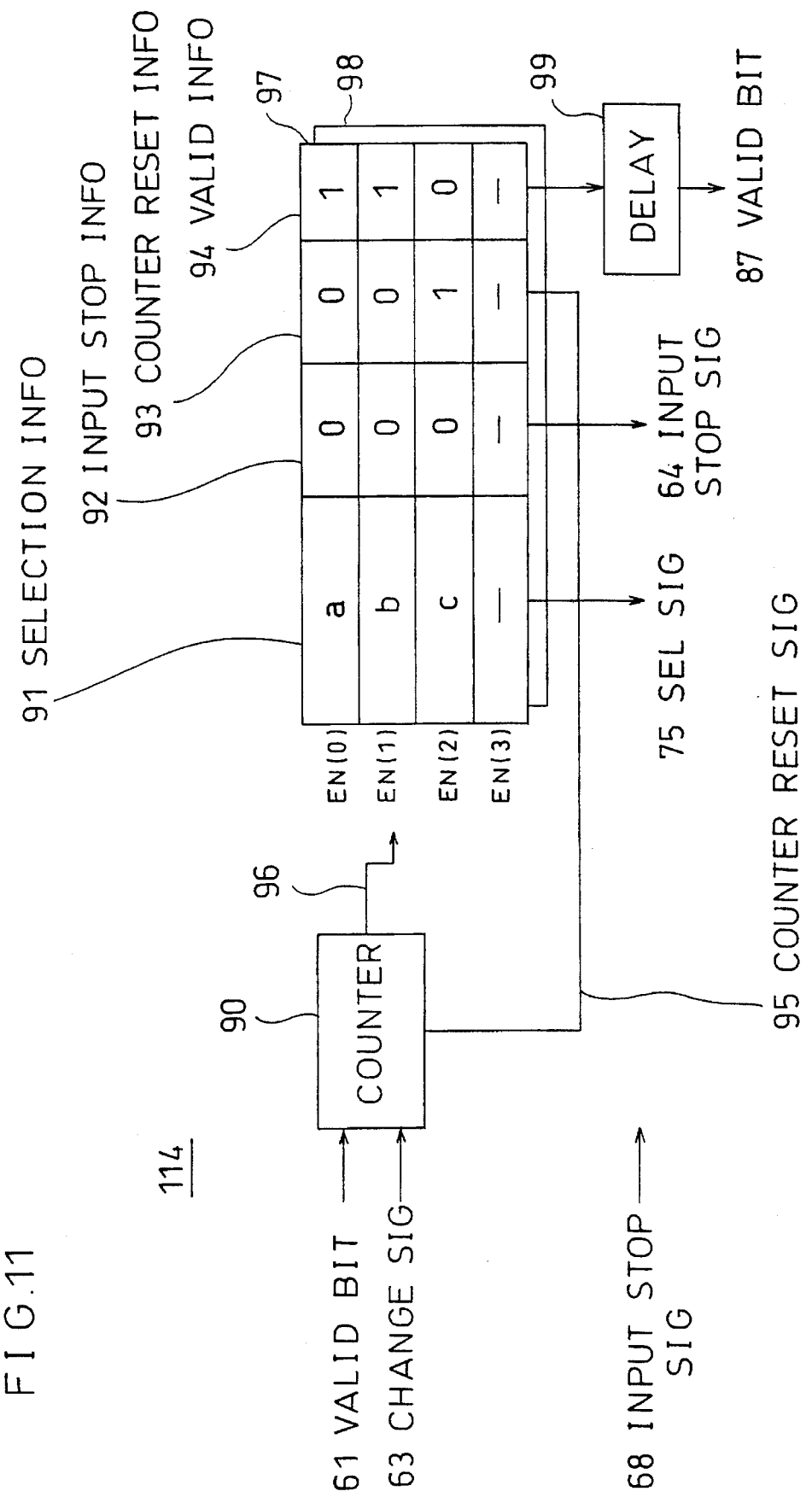
FIG. 11 is a block diagram showing the internal structure of a change control circuit of FIG. 10.
Figure 12:
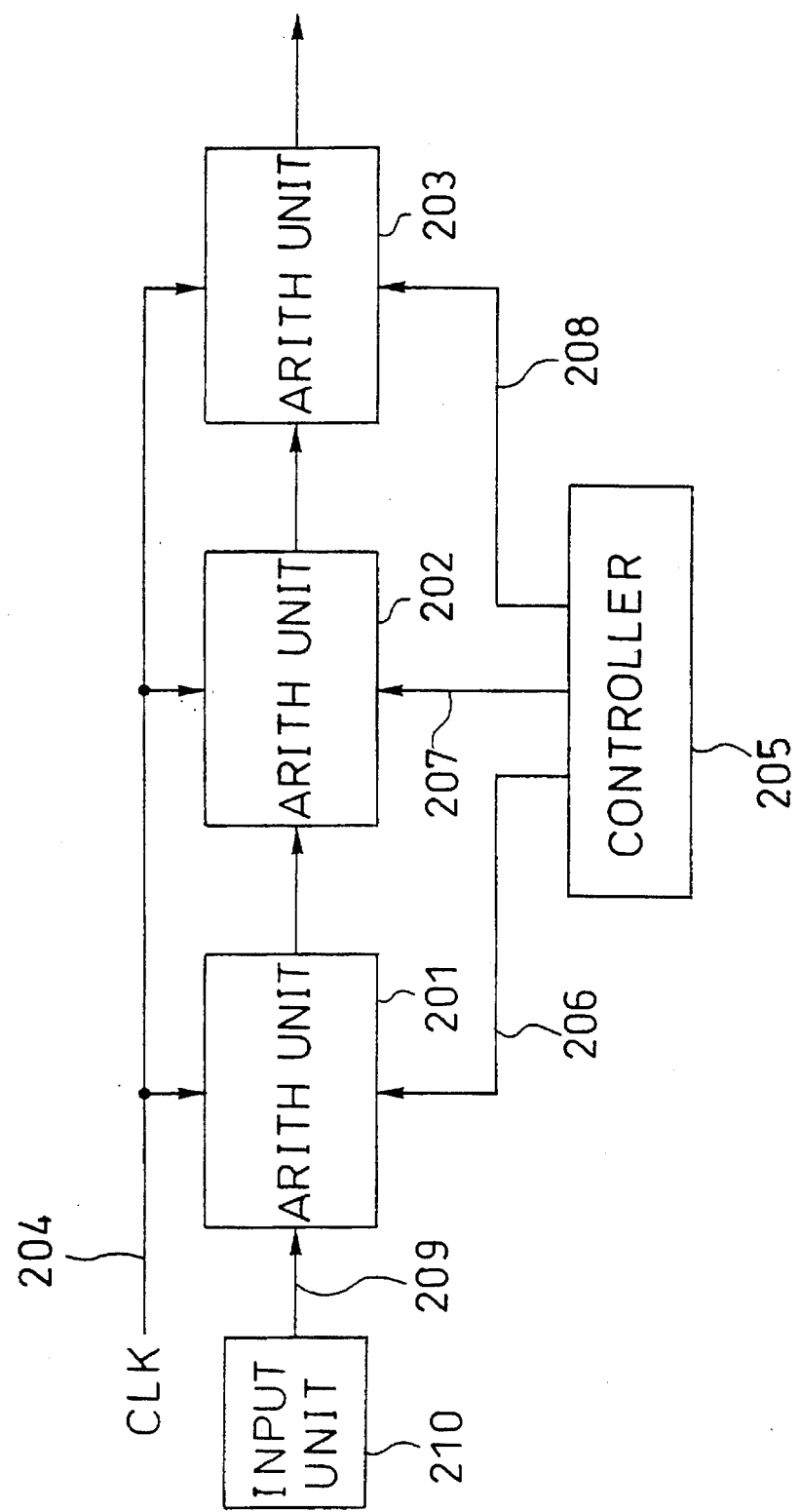
FIG. 12 is a block diagram showing the structure of a conventional signal processor.
Figure 13:
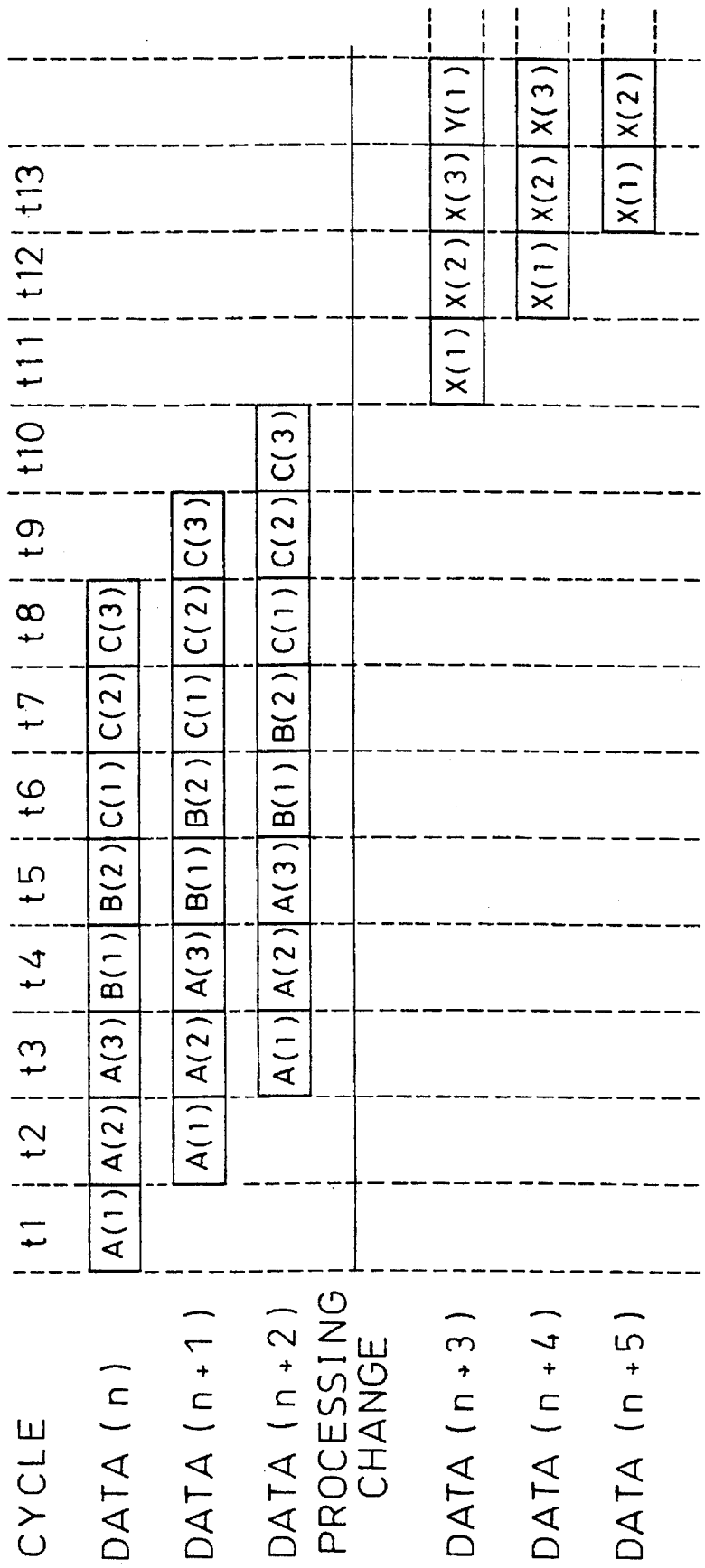
FIG. 13 is a timing diagram showing pipeline processing and process switching in the FIG. 12 signal processor.

FIG. 11 is a block diagram illustrating an example of the internal structure of CCC 114. Each entry of CCC 114 of FIG. 11 holds validity/invalidity indicating information 94 (valid information) indicative of whether a result of the processing is valid or invalid. If the validity/invalidity indicating information 94 read is "1", this indicates that a result of the processing is valid. On the other hand, if the validity/invalidity indicating information 94 read is "0", a result of the processing is invalid. The validity/invalidity indicating information 94 read is delayed by the number of cycles necessary for the operation of AU 51 by means of delay circuit 99 formed by, for example, a shift register, and is provided to CCC 115 as the validity/invalidity indicating signal 87.

In the FIG. 11 example, both the first cycle and the second cycle yield valid results and the third cycle yields an invalid result. Delay circuit 99 may be removed by storing in an entry the validity/invalidity indicating information 94 allowing for the number of cycles to be delayed by means of delay circuit 99.

The fourth embodiment produces the same effects as is achieved by the third embodiment. Additionally, the validity/invalidity indicating information 94 is held in the change control circuit, so that application of the validity/invalidity indicating signal can be controlled easily by an arbitrary sequence.

The invention claimed is:

1. A signal processor for sequentially performing arithmetical processing on data carried by an input data signal, said signal processor comprising:

plural arithmetic units connected in series, each said arithmetic unit receiving data from a preceding stage, performing a process of arithmetical operations on said received data, and providing a result of said process to a subsequent stage;

plural hold circuits for holding control information;

plural transfer circuits connected in series for performing sequential transfer of a selection signal according to a flow of said data through said plural arithmetic units, each said transfer circuit receiving said selection signal from a preceding stage and delaying transfer of said received selection signal to a subsequent stage by a proportional interval of time to a processing time of a corresponding one of said plural arithmetic units; and plural selection circuits for controlling the switching of said arithmetical operations in each said arithmetic unit according to said data flow, each said selection circuit receiving a selection signal identical with one inputted to a corresponding one of said plural transfer circuits, selecting among said plural hold circuits according to said received selection signal and fetching control information held in a selected one of said plural hold circuits, and providing said fetched control information to a corresponding one of said plural arithmetic units.

2. The signal processor of claim 1 further including a circuit for extracting data from said input data signal and providing said extracted data to a front-stage one of said plural arithmetic units.

3. The signal processor of claim 1 further including a circuit for detecting process-switching information in said input data signal and providing to a front-stage one of said plural transfer circuits and to a front-stage one of said plural selection circuits said selection signal according to said detected process-switching information.

4. A signal processor for sequentially performing arithmetical processing on data carried by an input data signal, said signal processor comprising:

plural arithmetic units connected in series, each said arithmetic unit receiving data from a preceding stage, performing a process of arithmetical operations on said received data, and providing a result of said process to a subsequent stage;

plural hold circuits for holding control information;

plural control circuits connected in series in a corresponding fashion to said plural arithmetic units, each said control circuit receiving a data validity/invalidity indicating signal, generating a selection signal according to said received data validity/invalidity indicating signal and a predesignated sequence, and providing, according to said received data validity/invalidity indicating signal, another data validity/invalidity indicating signal indicative of whether data serving as input to a subsequent-stage one of said plural arithmetic units is valid or invalid; and plural selection circuits for controlling the switching of said arithmetical operations in each said arithmetic unit according to said data flow, each said selection circuit receiving said selection signal generated by a corresponding one of said plural control circuits, selecting among said plural hold circuits according to said received selection signal and fetching control information held in a selected one of said plural hold circuits, and providing said fetched control information to a corresponding one of said plural arithmetic units.

5. The signal processor of claim 4 further including a circuit for extracting data from said input data signal, providing said extracted data to a front-stage one of said plural arithmetic units, generating a data validity/invalidity indicating signal for each extracted data, and providing said generated data validity/invalidity indicating signal to a front-stage one of said plural control circuits.

6. The signal processor of claim 4, each said control circuit having a plurality of entries for holding selection information and a counter for counting only ones of said received data validity/invalidity indicating signals indicative of the validity of data to be processed;

wherein said selection information held in said plural entries is read in sequence according to the output of said counter and said selection signal is generated according to said read selection information.

7. The signal processor of claim 4, each said control circuit having a plurality of entries for holding input stop information and a counter for counting only ones of said received data validity/invalidity indicating signals indicative of the validity of data to be processed;

wherein said input stop information held in said plural entries is read in sequence according to the output of said counter and input data to a corresponding one of said plural arithmetic units is held in its preceding stage according to said read input stop information.

8. The signal processor of claim 4, said plural control circuits having:

plural transfer circuits connected in series in a corresponding fashion to said plural arithmetic units, each said transfer circuit receiving from a preceding stage a change signal and delaying transfer of said received change signal to a subsequent stage by a proportional interval of time to a processing time of a corresponding one of said plural arithmetic units; and plural change control circuits each of which receives a change signal identical with one inputted to a corresponding one of said plural transfer circuits and changing a generation sequence of said selection signal according to said received change signal.

9. The signal processor of claim 8 further including a circuit for detecting process-switching information in said input data signal and providing to a front-stage one of said plural transfer circuits and to a front-stage one of said plural change control circuits said change signal according to said detected process-switching information.

10. The signal processor of claim 4, said plural control circuits having:

plural transfer circuits connected in series in a corresponding fashion to said plural arithmetic units, each said transfer circuit receiving from a preceding stage a data validity/invalidity indicating signal and delaying transfer of said received data validity/invalidity indicating signal to a subsequent stage by a proportional interval of time to a processing time of a corresponding one of said plural arithmetic units; and plural change control circuits, each said change control circuit receiving a data validity/invalidity indicating signal identical with one inputted to a corresponding one of said plural transfer circuits and generating said selection signal according to said received data validity/invalidity indicating signal and said predesignated sequence.

11. The signal processor of claim 10, each said transfer circuit further including a circuit for converting a data validity/invalidity indicating signal from a preceding stage indicative of the validity of data to be processed into one indicative of the invalidity of data and providing said converted signal to a subsequent stage.

12. The signal processor of claim 4, said plural control circuits having:

plural change control circuits connected in series in a corresponding fashion to said plural arithmetic units, each said change control circuit receiving said data validity/invalidity indicating signal from a preceding stage and generating said selection signal and said data validity/invalidity indicating signal to a subsequent stage according to said received data validity/invalidity indicating signal and said predesignated sequence.

13. The signal processor of claim 12, each said control circuit having a plurality of entries for holding data validity/invalidity indicating information and a counter for counting only ones of said received data validity/invalidity indicating signals indicative of the validity of data to be processed;

wherein said data validity/invalidity indicating information held in said plural entries is read in sequence according to the output of said counter and said data validity/invalidity indicating signal to be fed to a subsequent stage is generated according to said read data validity/invalidity indicating information.

14. A signal processor for performing arithmetical processing on data carried by an input data signal, said signal processor comprising:

an arithmetic unit for receiving data, performing a process of arithmetical operations on said received data, and providing a result of said arithmetical operation;

plural hold circuits for holding control information;

a change control circuit for inputting a data validity/invalidity indicating signal indicative of the validity of data to be processed by said arithmetic unit and generating a selection signal according to said input data validity/invalidity indicating signal and a predesignated sequence; and a selection circuit for controlling the switching of said arithmetic operations in said arithmetic unit, said selection circuit receiving said selection signal generated by said change control circuit, selecting among said plural hold circuits according to said received selection signal and fetching control information held in a selected one of said plural hold circuits, and providing said fetched control information to said arithmetic unit.

15. The signal processor of claim 14 further including a circuit for extracting data from said input data signal, providing said extracted data to said arithmetic unit, generating a data validity/invalidity indicating signal for each extracted data, and providing said generated data validity/invalidity indicating signal to said change control circuit.

16. The signal processor of claim 14, said change control circuit having a plurality of entries for holding selection information and a counter for counting only ones of said received data validity/invalidity indicating signals indicative of the validity of data to be processed;

wherein said selection information held in said plural entries is read in sequence according to the output of said counter and said selection signal is generated according to said read selection information.

17. The signal processor of claim 14, said change control circuit having a plurality of entries for holding input stop information and a counter for counting only ones of said received validity/invalidity indicating signals indicative of the validity of data to be processed;

wherein said input stop information held in said plural entries is read in sequence according to the output of said counter and input data to said arithmetic unit is held in its preceding stage according to said read input stop information.

18. The signal processor of claim 14, said change control circuit having a circuit for receiving a change signal and changing a sequence of generation of said selection signal according to said received change signal.

19. The signal processor of claim 18 further including a circuit for detecting process-switching information in said input data signal and providing to said change control circuit said change signal according to said detected process-switching information.

* * * * *